United States Patent
Griffiths et al.

(10) Patent No.: US 7,127,943 B1
(45) Date of Patent: Oct. 31, 2006

(54) METHOD AND APPARATUS FOR DETECTION OF FLUID LEVEL IN A CONTAINER

(75) Inventors: Robert W. Griffiths, Salt Lake City, UT (US); R. Bruce Draper, Sandy, UT (US)

(73) Assignee: Rocky Mountain Research, Inc., Salt Lake City, UT (US)

( * ) Notice: Subject to any disclaimer, the term of this patent is extended or adjusted under 35 U.S.C. 154(b) by 0 days.

(21) Appl. No.: 09/889,705

(22) PCT Filed: Jan. 19, 2000

(86) PCT No.: PCT/US00/01212

§ 371 (c)(1),
(2), (4) Date: Sep. 19, 2001

(87) PCT Pub. No.: WO00/42395

PCT Pub. Date: Jul. 20, 2000

Related U.S. Application Data

(60) Provisional application No. 60/116,302, filed on Jan. 19, 1999.

(51) Int. Cl.
*G01F 23/26* (2006.01)
(52) U.S. Cl. .................................... 73/304 C
(58) Field of Classification Search ............. 73/304 R, 73/304 C; 361/284
See application file for complete search history.

(56) References Cited

U.S. PATENT DOCUMENTS

| | | | |
|---|---|---|---|
| 3,641,543 A | 2/1972 | Rigby | |
| 3,807,231 A | 4/1974 | Spaw | |
| 3,862,571 A | 1/1975 | Vogel | |
| 3,939,360 A | 2/1976 | Jackson | |
| 4,083,038 A | 4/1978 | Klebanoff | |
| 4,099,167 A | 7/1978 | Pomerantz et al. | |
| 4,201,085 A | 5/1980 | Larson | |
| 4,347,740 A | 9/1982 | Townsend | |
| 4,365,788 A * | 12/1982 | Block | 266/44 |
| 4,389,889 A * | 6/1983 | Larson | 73/304 C |
| 4,601,201 A | 7/1986 | Oota et al. | |
| 4,749,988 A | 6/1988 | Berman et al. | |
| 4,890,491 A | 1/1990 | Vetter et al. | |
| 5,005,407 A | 4/1991 | Koon | |
| 5,043,707 A | 8/1991 | Heinze | |
| 5,051,921 A | 9/1991 | Paglione | |
| 5,121,639 A * | 6/1992 | McShane | 73/861.06 |

(Continued)

FOREIGN PATENT DOCUMENTS

EP        0 111 353        6/1984

(Continued)

OTHER PUBLICATIONS

European Search Report, dated May 27, 2003.

(Continued)

*Primary Examiner*—Hezron Williams
*Assistant Examiner*—Paul M. West
(74) *Attorney, Agent, or Firm*—TraskBritt, PC

(57) ABSTRACT

A fluid level sensor is disclosed having first and second vertically and horizontally nonoverlapping electrode plates for placing on a wall of a fluid container. Most preferably, the plates are also vertically spaced from each other. The capacitor plates are driven by a high frequency square wave. By forming nonoverlapping plates and driving them using a high frequency, the level of a fluid within the container, particularly viscous fluid, is more accurately detected. Control and detection circuitry is also disclosed to trigger an alarm if the fluid level drops below a critical level within the container.

28 Claims, 4 Drawing Sheets

U.S. PATENT DOCUMENTS

| | | |
|---|---|---|
| 5,135,485 A | 8/1992 | Cohen et al. |
| RE34,073 E | 9/1992 | Suzuki |
| 5,142,909 A | 9/1992 | Baughman |
| 5,406,843 A * | 4/1995 | Hannan et al. ........... 73/304 C |

FOREIGN PATENT DOCUMENTS

| | | | |
|---|---|---|---|
| EP | | 0111353 A2 | 6/1984 |
| WO | | WO 96/33393 | 10/1996 |

OTHER PUBLICATIONS

Supplemental European Search Report dated May 27, 2003 (2 pages).

* cited by examiner

METHOD AND APPARATUS FOR DETECTION OF FLUID LEVEL IN A CONTAINER

PRIORITY CLAIM

This application claims the benefit of the filing date of U.S. Provisional Patent Application Ser. No. 60/116,302, filed Jan. 19, 1999, for "METHOD AND APPARATUS FOR DETECTION OF A FLUID LEVEL IN A CONTAINER."

BACKGROUND OF THE INVENTION

The present invention relates generally to determining a level of a fluid in a container. More specifically, the invention relates to a method and apparatus for more accurately sensing when a relatively rapid egress of a viscous fluid, such as blood, reaches a level within the container. The invention is particularly useful in applications wherein a reduction in fluid level leaves a film of the fluid on an inner wall of the container.

STATE OF ART

Both rigid and flexible containers are used in many industries to hold and dispense fluids of various natures. Accordingly, fluid level sensors and corresponding circuitry to indicate the quantity of fluid within a container or when the fluid reaches a particular level within the container, such as with a gas tank of a car, are well known.

In the medical industry, both rigid and flexible containers are used with a variety of fluid level sensors. Sterile intravenous ("i.v.") bags and bottles are commonly used in hospitals to dispense plasma, whole blood, replacement electrolytes, etc. These containers are usually labeled to indicate their contents and volumes. When using such containers, a frequently used procedure is to dispense a metered amount of fluid over a given period of time by unmonitored, gravity-fed drip feeding. The containers themselves come in different sizes and shapes, and the fluids are administered to patients in widely varying flow rates which are often difficult to estimate exactly. Consequently, without directly monitoring the container throughout its use, it is often difficult to determine when all of the fluid within a container has been dispensed.

It is detrimental to a patient to have the flow of an i.v. fluid come to a complete stop, unattended, because of complications which can occur from the stop of fluid flow. Complications may include the clogging of the needle due to blood clotting, usually requiring reinsertion of a new needle, or blood passing out of the patient into the tubing. The more frequently a needle is inserted and reinserted into a vein, the greater the risk for complications and infection.

Solutions for medical fluid container monitoring range from complicated electronic, motor-driven, peristaltic pump-type systems, which exactly regulate the fluid flowing from the container to predict when it will run out, to relatively low-cost sensors which produce an audible alarm when the fluid has reached a particular level within its container. U.S. Pat. No. 3,641,543 to Rigby (Feb. 8, 1972) describes a probe-type fluid level sensor wherein two probes are placed within the fluid container to monitor the fluid level based upon the capacitance of the bottle/probes system. However, a common concern associated with probe-type fluid level sensors and other sensors which must be placed on the inside of the container involves the risk of introducing contamination into the fluid. For a hospital environment, particularly where fluids generally come in presterilized containers, introducing a probe into the fluid to determine its level is a great risk, and providing presterilized sensors already within the containers increases healthcare costs and requires hospitals to use common equipment for monitoring the sensors.

Sensors have also been developed for sensing fluid levels from the outside of a nonconductive container. Three-conductor sensors are shown in both U.S. Pat. No. 3,939,360 to Jackson (Feb. 17, 1976) and U.S. Pat. No. 4,083,038 to Klebanoff (Apr. 4, 1978). For each of these sensor systems, three conductive strips are placed in a parallel, vertically and horizontally overlapping arrangement on the side of a rigid container. An associated audible alarm signals when a fluid level within the container has dropped below a level determined by the position of the sensor on the container. For the three-conductor sensor systems, the alarm is triggered by differences in capacitance between a first and a second of the conductive strips and the capacitance between the second and a third of the conductive strips.

U.S. Pat. No. 5,135,485 to Cohen et al. (Aug. 4, 1992), the disclosure of which is hereby incorporated herein by reference, describes another capacitance-type fluid level sensing system having a fluid sensor comprising two conductive strips affixed to a flexible container in a parallel, vertically or horizontally overlapping relationship substantially coextensive with each other. Associated with the fluid sensor is a system of circuitry to produce an alarm signal when fluid in the container approaches a predetermined level determined by the position of the fluid sensor on the container and the settings of the control circuitry.

The control circuitry disclosed in Cohen et al. applies a reference voltage to a first resistor/capacitor combination and to a first input of a first monostable multivibrator. The control circuitry also applies the output of the resistor/capacitor combination to a second resistor/capacitor combination and to a first input of a second monostable multivibrator, and an oscillating wave to a second input of each of the monostable multivibrators. At the start of each oscillator cycle, the monostable multivibrators are triggered and the outputs of the multivibrators monitored to determine whether the first input of each monostable multivibrator rises to a predetermined level before the multivibrators are triggered again. When the first inputs of both multivibrators rise fast enough that their signals exceed a predetermined level before a subsequent triggering, a signal is produced to indicate the fluid level is below a desired level. The flexible container, fluid and sensor act as the capacitor in the first resistor/capacitor combination, the response of which adjusts the rise time of the input signal to the first multivibrator as the fluid level in the flexible container changes. As the volume of liquid within the flexible container decreases, the rise time of the output of the second monostable multivibrator increases such that the amplitude of the input signal increases with a decrease of the fluid level until the alarm level is reached.

U.S. Reissued Pat. 34,073 to Suzuki (Sep. 22, 1992), the disclosure of which is hereby incorporated herein by reference, describes a capacitance-type fluid level sensing system having two conductive strips affixed to a flexible container. Suzuki discloses both a horizontally overlapping, parallel configuration and a configuration wherein a second conductor is placed immediately opposite a first conductor on a container such that they are in a parallel, vertically overlapping configuration, but not immediately adjacent to each other on a common surface.

Venous blood containers, which are made of a rigid or flexible resin, are employed in heart-lung bypass circuits used during open heart surgery. It is critical to monitor the fluid (blood) level in such containers in a manner which provides an accurate and timely signal as to when blood in the container has been reduced below a certain level. While capacitance-type level sensors have been employed in an attempt to measure such blood levels, the viscous nature of blood leaves a film on the interior walls of the container, giving a false level indication. This phenomenon may be exacerbated during the latter stages of emptying a flexible bag when the inner walls of the bag tend to sag together, trapping the blood film therebetween. It is, therefore, desirable to have an external fluid level sensor which overcomes the problems associated with accurately sensing the levels of viscous fluids in both rigid and flexible containers.

SUMMARY

The present invention addresses the problems of conventional capacitance-type fluid level sensing devices by providing a reliable, relatively simple, capacitance-type level sensor system which is substantially less susceptible to false level readings attributable to the presence of a residual film of viscous fluid, such as blood, on an inner wall of a container to which the level sensor of the invention is affixed.

The system of the invention includes a disposable sensor permanently or removably placed on or inside a wall of a flexible or rigid, electrically nonconductive container. The sensor comprises two electrodes formed of essentially two-dimensional plates of electrically conductive material deposited on a thin, insulative film backing. The conductive material and the entire sensor assembly may be made opaque, translucent or transparent, as desired or required for the intended application. Alternatively, the sensor plates may be formed directly on the material comprising the container wall.

Each of the two plates of the sensor acts as a plate for a capacitor, the fluid inside the container acting as the second plate for each capacitor and conducting the electric field between the capacitors. The container wall acts as a dielectric for the capacitor. As the fluid level within the container changes, the capacitance changes slightly. This change in capacitance is detected by control circuitry which activates visual and auditory alarms if the capacitance drops below a predetermined level.

The size of the sensor in terms of plate length and vertical as well as any horizontal separation of the plates may be optimized for the system frequency and container wall material and thickness, as well as the nature of the fluid, the level of which is to be monitored. The plates of the sensor are arranged with a vertical separation to allow detection of a rapid decrease of fluid level where a residual layer or film of fluid is left on the container walls. Horizontal separation of the plates may be adjusted depending upon the resistance attributable to the fluid film on the interior of the container wall. The sensor is most preferably configured so that the capacitor plates are arranged with a vertical separation so that an upper plate is completely exposed and the film is allowed to dissipate while the fluid is still lowering over a second, lower plate. The plates may also be horizontally separated by at least a small distance, or at least not overlap horizontally, to maximize the film resistance between the sensors. The above-described sensor and control circuit configuration allows the level detection of blood and other conductive fluids that leave a conductive film on the container wall.

The system further includes a control box housing detection and control circuitry which is attached to the sensor with a connector and flexible cable. The connector may be a Zero Insertion Force (ZIF) connector as known in the art. If desired, the cable and connector may be made part of a sensor assembly and disposable therewith. The control box incorporates both audio and visual alarms to indicate that the sensor is not connected to the control box as well as if the sensor does not detect the fluid (i.e., the fluid level is below the sensor).

As noted previously, many fluids, particularly those of substantial viscosity, leave thin conductive films on the container walls that may take seconds, or even minutes, to thin to a level where a conventional capacitor-type level sensor may detect the change. To be able to accurately detect rapidly changing fluid levels in spite of the thin, conductive fluid film left on the container walls, several things should happen. First, as noted above, it is desirable to drive the sensor capacitance with a high frequency of about 4 MHz or greater. At lower frequencies, for example, 1 MHz, a residual film of blood on a container wall may give a false level reading, indicating erroneously that the blood level within the container is at or higher than the level of the sensor. The thin, conductive fluid film may be characterized as small capacitive electrodes extending through the resistive portion of the film. The film resistance and capacitances together act as a low pass filter. Therefore, increasing the frequency reduces the effect of the capacitance in the residual film adjacent the sensor.

The control box circuitry is configured to detect a change in capacitance of the sensor by applying a high-frequency, preferably at least about 4 MHz, and most preferably at least about 8 MHz, square wave to a series resistor and capacitor network. The resistor is located in the control box and the capacitor network is provided by a combination of the cable capacitance and the sensor capacitance. This arrangement and the driving signal result in a substantially triangular wave output at the capacitor which is amplified and monitored for a small change in amplitude resulting from a change in the network capacitance due to a fluid level change within the container.

The frequency of the square wave input signal has been selected by experimentation to minimize capacitance detected attributable to a thin layer of fluid remaining on the side walls of the container as the fluid level lowers past the sensor. When the capacitance lowers due to the fluid level lowering past the sensor, a comparator detects the amplitude change and filters the detection noise and produces visual and audio alarms.

DETAILED DESCRIPTION

Figure 1:
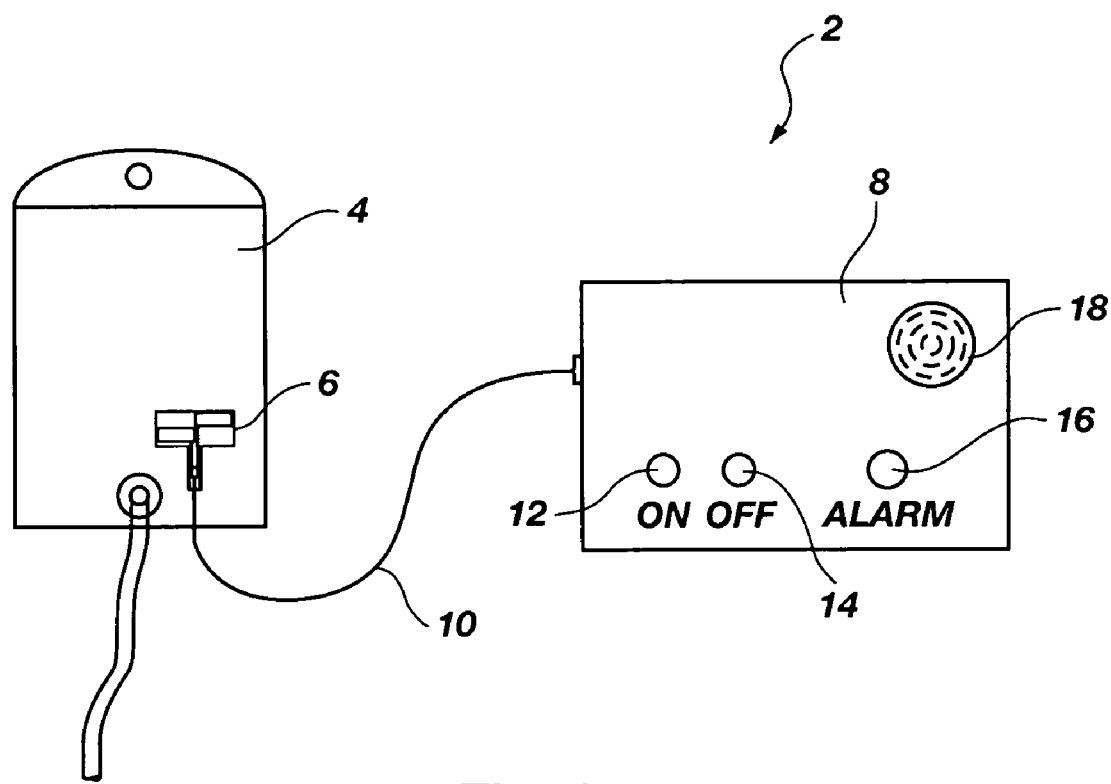
FIG. 1 is a diagram of a sensor system according to the present invention.

FIG. 1 depicts a fluid level sensor system 2 according to an embodiment of the present invention including a fluid container 4, a fluid level sensor 6, and detection and control circuitry housed in a control box 8. The fluid container 4 may be any fluid container having an electrically nonconductive wall such as both the rigid- and flexible-walled fluid containers commonly used in medical applications for storing blood, saline solution, human waste, or other fluids or mixtures. The fluid level sensor 6 may be affixed to a side of the fluid container 4 by an adhesive such as a pressure sensitive adhesive or other medical grade adhesive well known to one of ordinary skill in the art. The fluid level sensor 6 may be affixed to an outside wall of the fluid container 4 by medical personnel or other operator just before use, or formed on or within the fluid container wall as part of a manufacturing process and sold as an integral unit with the fluid container 4.

A conductive cable 10, such as a coaxial cable or other two-signal cable, couples the fluid level sensor 6 to the detection and control circuitry within the control box 8 and may be formed as part of the fluid level sensor 6, as part of the detection and control circuitry, or as a separate part to couple to both the fluid level sensor 6 and the detection and control circuitry prior to use. Most preferably, the cable 10 is coupled to the fluid level sensor 6 through a Zero Insertion Force ("ZIF") connector as is known in the art.

As illustrated in FIG. 1, the detection and control circuitry most preferably includes an external switch for controlling the fluid level sensor system 2 between On 12 and Off 14 states. Although the switching devices 12 and 14 of FIG. 1 are shown as separate switching devices, other switching devices known in the art, such as a single-pole-double-throw switch, may serve the same function of activating and deactivating the circuitry. The detection and control circuitry also includes external alarm indicators 16 and 18 to enable both a visual alarm 16 and an audible alarm 18 from within the control box 8. Additionally, the detection and control circuitry may include other control devices such as buttons to deactivate an audible alarm or reset a system, and other indicators such as a display to indicate a more precise fluid level.

Figure 2:
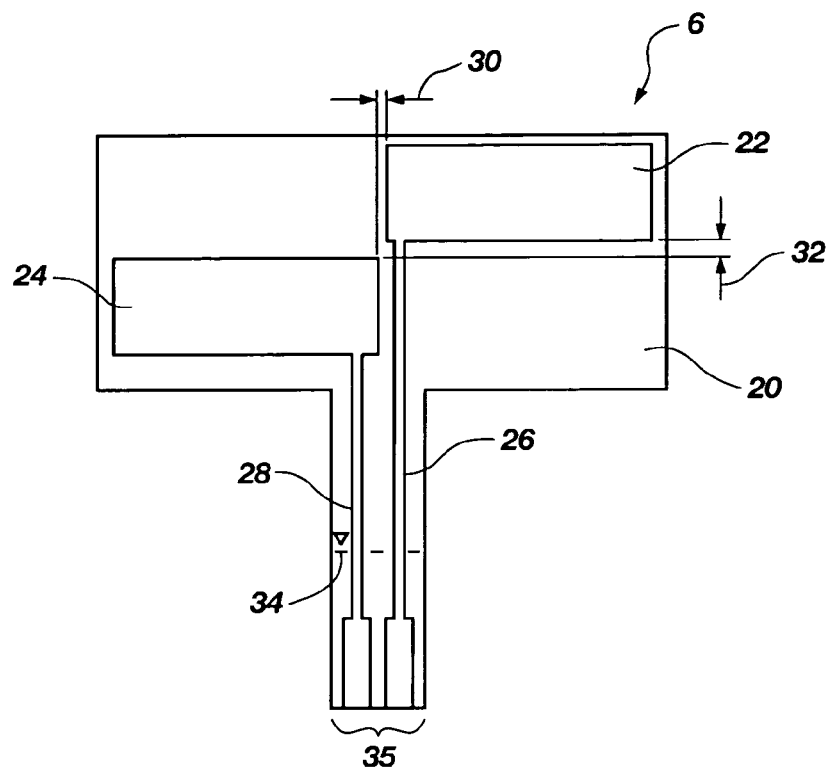
FIG. 2 is a diagram of a fluid level sensor according to an embodiment of the present invention.
Figure 3:
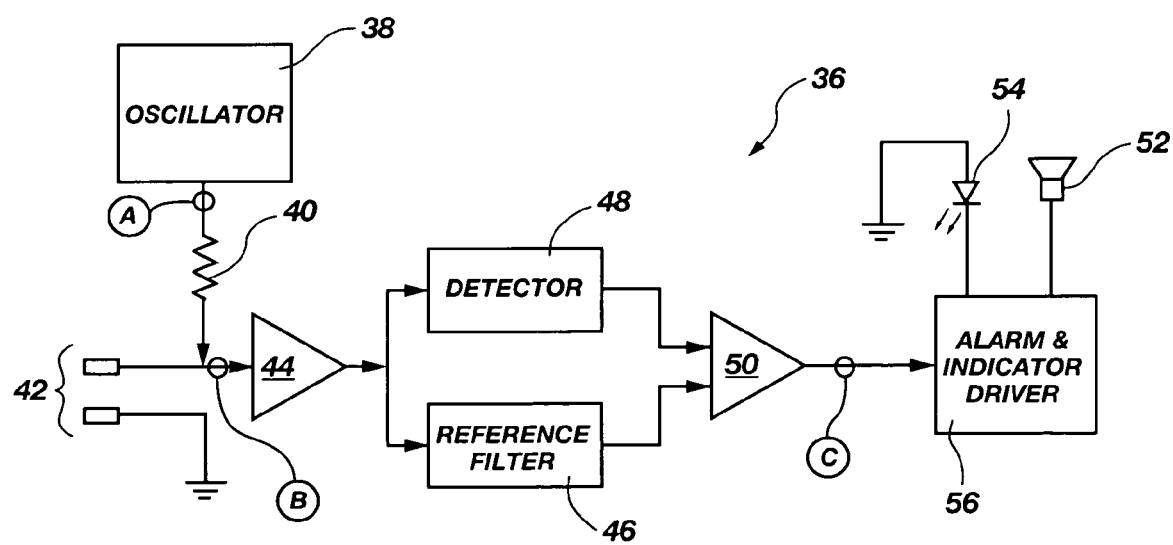
FIG. 3 is a block diagram of an embodiment of the control circuitry of the present invention.

FIG. 2 is a diagram of an embodiment of the fluid level sensor 6 of the present invention comprising a thin, electrically insulative film 20, a pair of conductive plates 22 and 24, and conductive traces 26 and 28 extending from each of the conductive plates 22 and 24 to a terminal area 35 to facilitate easier coupling between the conductive plates 22 and 24 and the detection and control circuitry 36 (see FIG. 3). The two conductive plates 22 and 24 of the fluid level sensor 6 are preferably vertically spaced and horizontally nonoverlapping, or are offset plates of conductive material such as gold, silver, copper, aluminum, or other nonmetallic conductor. Most preferably, an opaque or transparent conductive material such as screened silver or gold, or indium tin oxide ("ITO") such as is commonly used in electronic displays, is used to form the conductive plates 22 and 24 so that the conductive plates do not block an operator's view of the fluid within the container. The thin, electrically insulative film 20 may be formed of any insulating material suitable as a dielectric for a capacitor. An example of a suitable film includes Mylar™. As required by a particular application, the conductive and nonconductive materials comprising the fluid level sensor 6 may be made opaque, translucent or transparent. A connector insertion point indicator 34 is also preferably applied to the insulative film 20 to indicate to the user when the terminal area 35, including the enlarged trace ends, has been fully inserted into a connector socket.

Although vertically or horizontally overlapping or non-offset plates will function as a sensor, to the extent the sensor plates overlap or are not offset, the rate at which the circuit detects rapidly lowering fluid levels is significantly decreased. This decrease in performance is experienced because the fluid film remaining on the container wall continues to conduct more through the overlapping area. Experimentation has shown the best results occur where there is little or substantially no overlapping because the signal must travel a longer path through the fluid film.

The two conductive plates 22 and 24 operate, in conjunction with the fluid within the fluid container 4 (see FIG. 1), as two capacitors in series, each conductive plate 22 and 24 forming a capacitor with the fluid in the fluid container 4 using the fluid container wall as a dielectric. As the fluid level within the fluid container 4 changes, the conduction between the plates change, causing a difference in the detected capacitance of the plate/fluid system changes.

A difficulty experienced with systems using vertically or horizontally overlapping conductive plates is that as the fluid level within the container decreases, there may be residual fluid film left on the walls of the container. For highly viscous fluids such as blood, the residual fluid left on the walls of the container may take a few seconds or even a few minutes to flow off. For fluid level sensors employing horizontally or vertically overlapping or partially overlapping plates, detection of the fluid level within the fluid container is more delayed than with nonoverlapping plates. The nonoverlapping arrangement of the conductive plates 22 and 24 assists in a more rapid and accurate determination of when the fluid level within the fluid container 4 has reached a critical range near the sensor level. Arranging the conductive plates 22 and 24 with a larger vertical separation or spacing 32 enables an easier detection of a rapid decrease of fluid level where a residual layer or film of fluid is left on the container walls. Arranging the conductive plates 22 and 24 with a larger horizontal separation or spacing 30 adjusts for the system resistance attributable to the fluid film on the interior of the container wall. The amount of separation placed between the conductive plates 22 and 24 is limited, however, by the fluid level range within which an indication is acceptable. For example, by increasing the vertical separation 32 between the conductive plates 22 and 24, the accuracy of the sensor indication becomes more resistant to the effects of a viscous film, but the range within which the indication may initiate also increases. For the conductive plate arrangement illustrated in FIG. 2, vertical spacing 32 changes had a greater effect on sensor accuracy than did horizontal spacing 30 changes because the fluid flow level decreased along a vertical axis.

The dimensions of the conductive plates 22 and 24 in terms of plate thickness, width and length, as well as their horizontal 30 and vertical 32 spacing from each other, may be optimized for the system frequency, container wall material and thickness, as well as the nature of the fluid, positioning of the sensor and quantity of fluid to be monitored. The thickness and, to a lesser extent, the material of the container are largely determinative of the conductive area required. The vertical separation 32 of the conductive plates 22 and 24, one plate above the other, encourages the fluid film over the upper plate to thin out as the fluid is lowering over the lower plate. The horizontal separation 30, if any, of the conductive plates 22 and 24 increases the resistance between the plates attributable to the residual film on the inside of the container wall. Relatively larger or longer electrode plates are more desirable for use with relatively rigid containers with their thicker walls to increase the relatively lower capacitance associated therewith. Relatively smaller or shorter electrode plates appear to produce superior results on flexible-walled containers. It is believed that one of ordinary skill in the art is sufficiently familiar with capacitor-type fluid sensor design techniques to design a suitable fluid level sensor 6, given the characteristics of the particular system for which the fluid level sensor 6 will be used. The conductive plates 22 and 24 are each coupled to detection and control circuitry 36 (FIG. 3) through conductive traces 26 and 28 secured to the thin, electrically insulative film 20 and extending to a terminal area 35.

Figure 4:
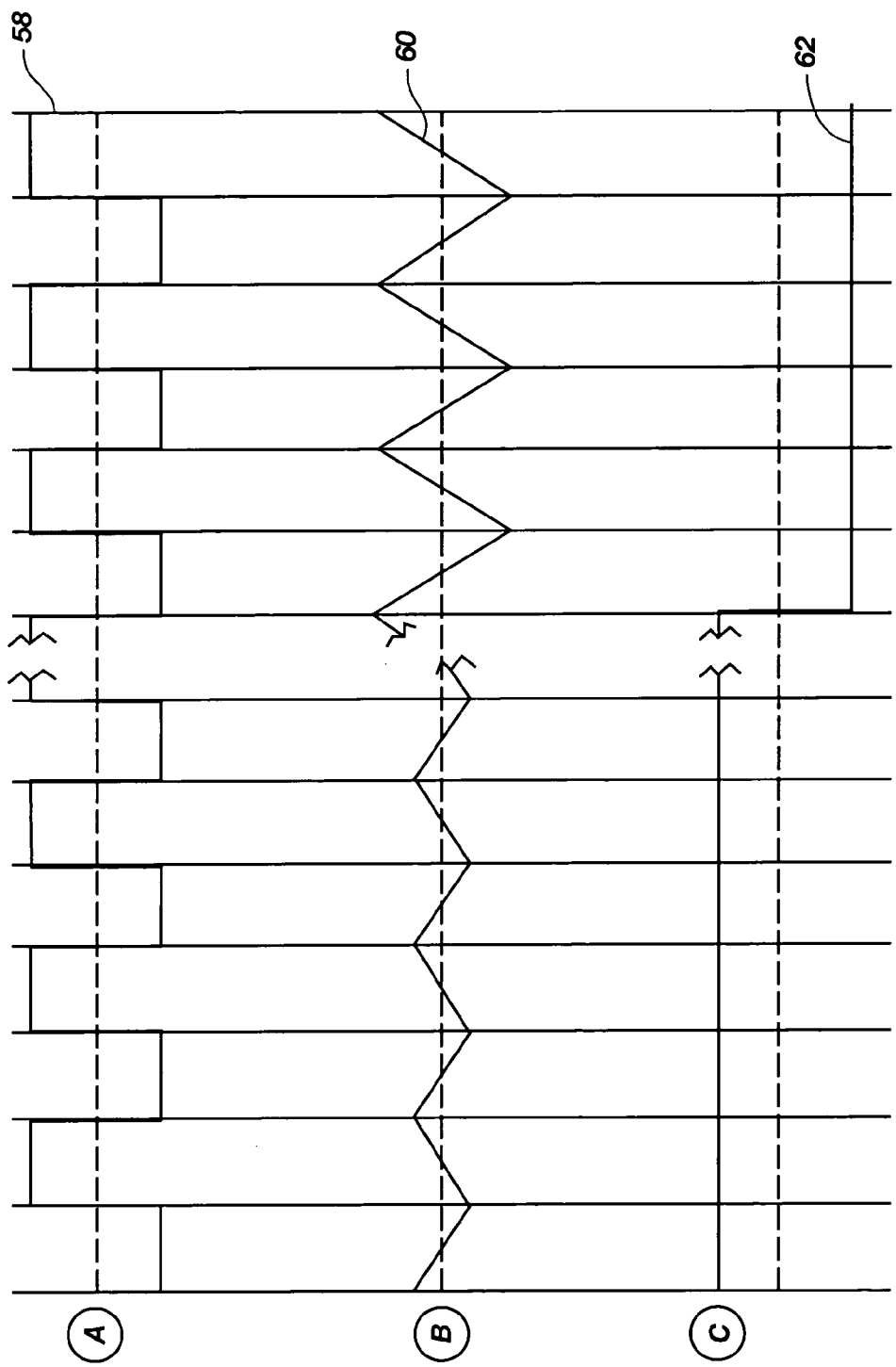
FIG. 4 is a timing diagram relating to signals within the control circuitry of the present invention.

FIG. 3 illustrates a block diagram of detection and control circuitry 36 according to an embodiment of the present invention. The detection and control circuitry 36 is configured to detect a change in the capacitance of the sensor by applying a high-frequency signal from oscillator 38 at point A, preferably at least about a 4 MHz, and most preferably at least about an 8 MHz, square wave 58 (see FIG. 4) to a series resistor 40, coupled to a first of two terminals 42 for connection to a fluid level sensor 6 such as that illustrated in FIG. 2. The second of the two terminals 42 may be connected to a reference voltage such as ground. From the combination of the R-C constant effects of the series resistor 40, and the capacitance caused by the fluid level sensor and sensor cable attached to the two terminals 42, the signal B at the junction of the series resistor 40 and the first of the two terminals 42 approximates a triangular wave signal 60 (see FIG. 4). The triangular wave signal 60 (FIG. 4) is input into an amplifier 44, such as an operational amplifier, to boost the signal. The boosted signal is then filtered by a reference filter 46 to give a relative amplitude of the signal. The boosted signal is also sent through a detector 48 to establish a DC reference voltage to act as a threshold for the sensor alarm. The outputs of both the reference filter 46 and the detector 48 are compared using a threshold comparator 50 to determine whether the reference filter 46 output signal exceeds the DC reference voltage threshold. When the output of the detector 48 exceeds the DC reference voltage threshold, the threshold comparator 50 output signal at point C drops low as shown at 62 in FIG. 4, indicating to the alarm and indicator driver circuit 56 that an alarm should be initiated. Alarm and indicator driver circuit 56 initiates the visual indicator alarm 54 and the auditory alarm 52 in response to the threshold comparator 50 output going low.

Figure 5C:
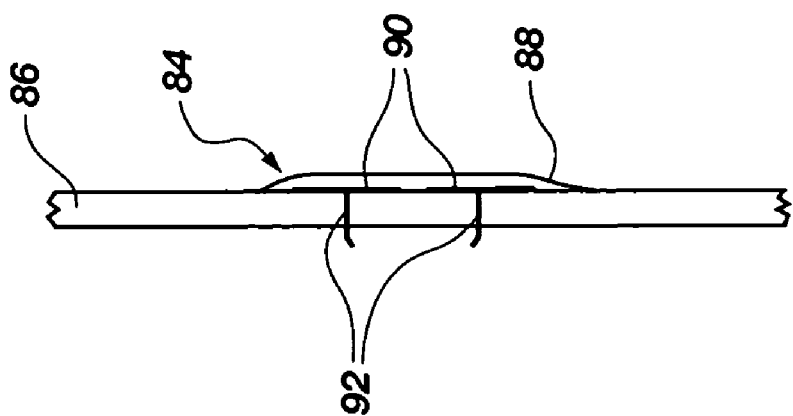
FIGS. 5a–5c are diagrams of a sensor and fluid container wall according to embodiments of the present invention.
Figure 5B:
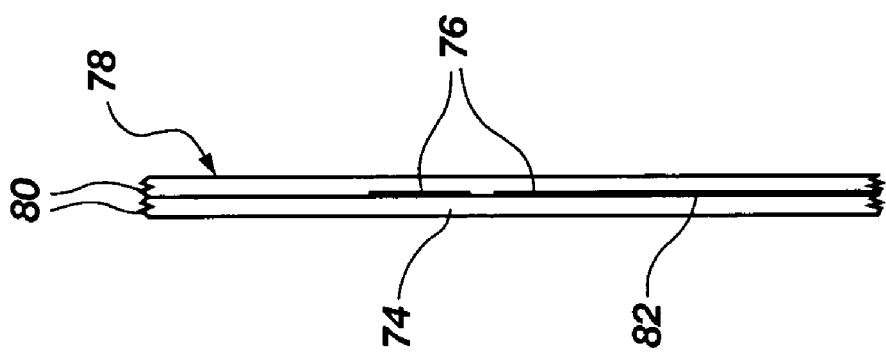
Figure 5A:
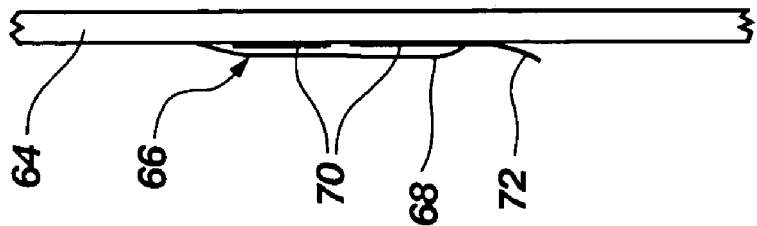

FIG. 5a depicts a fluid container wall 64 having a fluid sensor 66 affixed to an external surface of the wall 64. The fluid sensor 66 includes a thin, electrically insulative mounting structure 68, first and second electrodes 70 and a terminal area 72 to which control circuitry may be coupled. FIG. 5b depicts a fluid sensor 74 wherein the fluid sensor electrodes 76 are placed within the fluid container wall 78. The fluid sensor electrodes 76 may be placed within the fluid container wall 78 by forming the electrodes 76 on a surface of, or affixing the electrodes 76 to a surface of, one of two flexible or rigid wall sheets 80, and then affixing the wall sheets 80 to each other. Conductors 82 from each of the electrodes 76 may extend between the wall sheets 80 to a container wall exit point and terminal area or, as shown in FIG. 5c, may extend through the container wall 86 to an external surface of the container for coupling to control circuitry. FIG. 5c illustrates a sensor 84 affixed to an internal surface of a fluid container wall 86. The sensor in the embodiment of FIG. 5c includes a thin, electrically insulative film 88 isolating sensor electrodes 90 from an internal volume of the fluid container. In this way, when the fluid container is filled with fluid, the electrodes are not shorted by the fluid. The thin, electrically insulative film 88 acts as the dielectric for the sensor capacitor in this embodiment. Conductors 92 may extend through the fluid container wall 86 immediately behind the electrically insulative film 88 to allow for coupling with control circuitry while minimizing the possibility of contamination with the internal volume of the fluid container. Alternatively, conductors may extend along an inside surface of the fluid container wall 86 and exit the container at another location.

While the system is preferably powered with a conventional nine volt battery, other power sources could be easily adapted.

Obviously, the fluid-level sensor shown and described with reference to FIG. 2, though particularly useful for detecting a lowering level of viscous fluid within a container, will also function for a rising level of fluid. One of ordinary skill in the art will understand the minor circuit modifications required to enable the sensor to detect and alert to fluid rising to a predetermined level.

It should be noted that for many control circuits known in the art, temperature compensation relative to ambient temperature ($\approx$22° C.) may be necessary to ensure accurate level detectin. Since the temperature of the environment in which the system of the invention is employed may vary significantly, particularly in less-developed regions of the world where operating rooms are not climate controlled, such temperature compensation is believed to be a significant feature of the system. It should also be noted that bloods with higher hematocrits (red blood cell percentages) are more viscous and thus more likely to fail to initiate a low fluid level signal if the electrode plates are not appropriately sized and spaced.

While the invention has been described in terms of a preferred embodiment, it will be understood and appreciated by those of ordinary skill in the art that it is not so limited. Many additions, deletions and modifications to the embodiment disclosed herein may be made without departing from the scope of the invention.

What is claimed is:

1. A capacitive sensor for detecting a level of a viscous fluid in a container having an interior volume, the sensor comprising mutually cooperative, mutually electrically isolated first, upper and second, lower electrodes arranged for placement on a wall of the container in isolation from the interior volume of the container, wherein each of the first and second electrodes exhibits a two-dimensional area having a vertical dimension and a horizontal dimension, and wherein the first and second electrodes are arranged in mutual proximity such that at least a majority of each of their respective areas are both vertically and horizontally offset from each other and to an extent at least sufficient to enable rapid detection of a decreasing level of the viscous fluid in the container when the viscous fluid has reached a level proximate a lower edge of the first, upper electrode and a residual film of the viscous fluid remains on an inner surface of the wall of the container above the level of the viscous fluid and adjacent at least a portion of the first, upper electrode.

2. The sensor of claim 1, wherein the first and second electrodes are arranged such that their respective areas are substantially both vertically and horizontally offset from each other.

3. The sensor of claim 1, wherein the first and second electrodes are arranged such that their respective areas are completely both vertically and horizontally offset from each other.

4. The sensor of claim 1, wherein the first and second electrodes are both vertically and horizontally spaced from each other.

5. The sensor of claim 1, wherein the electrodes comprise substantially two-dimensional plates.

6. The sensor of claim 1, further comprising a conductor coupled to each of the first and second electrodes.

7. The sensor of claim 6, wherein the conductors coupled to each of the first and second electrodes are also coupled to control circuitry.

8. The sensor of claim 7, wherein the conductors coupled to each of the first and second electrodes are coupled to the control circuitry through a Zero Insertion Force connector.

9. The sensor of claim 1, further comprising control circuitry, wherein the control circuitry is coupled to one of the first and second electrodes and configured to supply an oscillating signal having a frequency greater than 1 MHz thereto, another of the first and second electrodes being coupled to a reference voltage.

10. The sensor of claim 9, wherein the control circuitry is configured to supply a signal at a frequency of at least about 4 MHz.

11. The sensor of claim 10, wherein the control circuitry is configured to supply a signal at a frequency of at least about 8 MHz.

12. The sensor of claim 1, further comprising control circuitry coupled to one of the first and second electrodes and configured to detect a change in a capacitance of the sensor.

13. The sensor of claim 1, further comprising at least one alarm responsive to an output signal of the sensor.

14. The sensor of claim 1, wherein the first and second electrodes are horizontally spaced.

15. The sensor of claim 1, wherein the first and second electrodes are arranged for placement on a wall of the container.

16. The sensor of claim 15, further comprising a mounting structure to which the first and second electrodes are affixed.

17. The sensor of claim 16, wherein the mounting structure is a thin, electrically insulative film.

18. The sensor of claim 17, wherein the thin, electrically insulative film is Mylar.

19. The sensor of claim 1, wherein the first and second electrodes are placed within the wall of the container.

20. A method for detecting a level of a viscous fluid within a container having an interior volume, comprising:

placing a capacitive structure including mutually cooperative, mutually electrically isolated, first, upper, and second, lower electrodes on a wall of the container in isolation from the interior volume of the container, wherein each electrode exhibits a two-dimensional area having a vertical dimension and a horizontal dimension and wherein the first and second electrodes are arranged in mutually proximity such that at least a majority of each of their respective areas are both vertically and horizontally offset from each other;

driving the capacitive structure with an oscillating signal at a frequency of more than about 1 MHz and generating an output signal from the capacitive structure responsive thereto;

decreasing a fluid level within the container at a rate sufficient to leave a residual film of the viscous fluid on an interior surface of the wall above the level of the viscous fluid and at least proximate a lower edge of the first, upper electrode; and rapidly detecting a change in the output signal responsive to the decreasing of the fluid level.

21. The method of claim 20, wherein placing the capacitive structure on a wall of the container comprises placing the capacitive structure within the wall of the container.

22. The method of claim 20, wherein driving the capacitive structure with an oscillating signal at a frequency of more than about 1 MHz further comprises driving the capacitive structure at a frequency of at least about 4 MHz.

23. The method of claim 20, wherein driving the capacitive structure with an oscillating signal at a frequency of more than about 1 MHz further comprises driving the capacitive structure at a frequency of at least about 8 MHz.

24. The method of claim 20, wherein placing the capacitive structure on a wall of the container comprises forming the capacitive structure on a mounting structure and affixing the mounting structure to an exterior wall of the container with adhesive.

25. The method of claim 20, wherein placing the capacitive structure on a wall of the container comprises forming the capacitive structure on the wall.

26. The sensor of claim 20, further comprising determining whether the output signal exceeds a reference signal.

27. The method of claim 26, further comprising initiating at least one alarm if the output signal exceeds the reference signal.

28. The method of claim 27, wherein the at least one alarm is at least one of an audible alarm and a visual alarm.

* * * * *